US008112436B2

(12) United States Patent
Lu et al.

(10) Patent No.: US 8,112,436 B2
(45) Date of Patent: Feb. 7, 2012

(54) SEMANTIC AND TEXT MATCHING TECHNIQUES FOR NETWORK SEARCH

(75) Inventors: Yumao Lu, San Jose, CA (US); Lei Duan, San Jose, CA (US); Fan Li, Sunnyvale, CA (US); Benoit Dumoulin, Palo Alto, CA (US); Xing Wei, Sunnyvale, CA (US)

(73) Assignee: Yahoo ! Inc., Sunnyvale, CA (US)

( * ) Notice: Subject to any disclaimer, the term of this patent is extended or adjusted under 35 U.S.C. 154(b) by 324 days.

(21) Appl. No.: 12/563,357

(22) Filed: Sep. 21, 2009

(65) Prior Publication Data
US 2011/0072021 A1 Mar. 24, 2011

(51) Int. Cl.
*G06F 17/30* (2006.01)

(52) U.S. Cl. ........ 707/769; 707/708; 707/728; 707/739; 707/748; 707/754

(58) Field of Classification Search .................. 707/708, 707/728, 739, 748, 754, 769
See application file for complete search history.

(56) References Cited

U.S. PATENT DOCUMENTS

| 6,523,026 | B1 * | 2/2003 | Gillis ..................................... 1/1 |
| 2003/0191627 | A1 * | 10/2003 | Au ..................................... 704/9 |
| 2008/0005103 | A1 * | 1/2008 | Ratcliffe et al. .................. 707/5 |
| 2009/0157405 | A1 * | 6/2009 | Stewart et al. ................. 704/257 |

OTHER PUBLICATIONS

Lu et al., U.S. Appl. No. 12/360,016, entitled "*System and Method for Ranking Web Searches with Quantified Semantic Features*," 31 pages of specification, claims and abstract, 3 pages of drawings, Jan. 26, 2009.

Lu et al., "Improving Web Search Relevance with Semantic Features," Proceedings of the 2009 Conference on Empirical Methods in Natural Language Processing, Singapore, Aug. 6-7, 2009, pp. 648-657.

* cited by examiner

*Primary Examiner* — Shahid Alam
*Assistant Examiner* — Andalib Lodhi
(74) *Attorney, Agent, or Firm* — SNR Denton US LLP

(57) ABSTRACT

In one embodiment, access a search query comprising one or more query words, at least one of the query words representing one or more query concepts; access a network document identified for a search query by a search engine, the network document comprising one or more document words, at least one of the document words representing one or more document concepts; semantic-text match the search query and the network document to determine one or more negative semantic-text matches; and construct one or more negative features based on the negative semantic-text matches.

33 Claims, 5 Drawing Sheets

SEMANTIC AND TEXT MATCHING TECHNIQUES FOR NETWORK SEARCH

TECHNICAL FIELD

The present disclosure generally relates to improving the quality of the search results generated by the search engines and more specifically relates to generating features that may be used by the ranking algorithms implemented by the search engines.

BACKGROUND

The Internet provides a vast amount of information. The individual pieces of information are often referred to as "network resources" or "network contents" and may have various formats, such as, without limitation, texts, audios, videos, images, web pages, documents, executables, etc. The network resources or contents are stored at many different sites, such as on computers and servers, in databases, etc., around the world. These different sites are communicatively linked to the Internet through various network infrastructures. Any person may access the publicly available network resources or contents via a suitable network device (e.g., a computer connected to the Internet).

However, due to the sheer amount of information available on the Internet, it is impractical as well as impossible for a person (e.g., a network user) to manually search throughout the Internet for specific pieces of information. Instead, most people rely on different types of computer-implemented tools to help them locate the desired network resources or contents. One of the most commonly and widely used computer-implemented tools is a search engine, such as the search engines provided by Yahoo!® Inc. (http://search.yahoo.com) and Google™ (http://www.google.com). To search for information relating to a specific subject matter on the Internet, a network user typically provides a short phrase describing the subject matter, often referred to as a "search query", to a search engine. The search engine conducts a search based on the query phrase using various search algorithms and generates a search result that identifies network resources or contents that are most likely to be related to the search query. The network resources or contents are presented to the network user, often in the form of a list of links, each link being associated with a different document (e.g., a web page) that contains some of the identified network resources or contents. In particular embodiments, each link is in the form of a Uniform Resource Locator (URL) that specifies where the corresponding document is located and the mechanism for retrieving it. The network user is then able to click on the URL links to view the specific network resources or contents contained in the corresponding document as he wishes.

Sophisticated search engines implement many other functionalities in addition to merely identifying the network resources or contents as a part of the search process. For example, a search engine usually ranks the identified network resources or contents according to their relative degrees of relevance with respect to the search query, such that the network resources or contents that are relatively more relevant to the search query are ranked higher and consequently are presented to the network user before the network resources or contents that are relatively less relevant to the search query. The search engine may also provide a short summary of each of the identified network resources or contents.

There are continuous efforts to improve the qualities of the search results generated by the search engines. Accuracy, completeness, presentation order, and speed are but a few of the performance aspects of the search engines for improvement.

SUMMARY

The present disclosure generally relates to improving the quality of the search results generated by the search engines and more specifically relates to generating features that may be used by the ranking algorithms implemented by the search engines.

In particular embodiments, access a search query comprising one or more query words, at least one of the query words representing one or more query concepts. Access a network document identified for a search query by a search engine, the network document comprising one or more document words, at least one of the document words representing one or more document concepts. Semantic-text match the search query and the network document to determine one or more negative semantic-text matches. Construct one or more negative features based on the negative semantic-text matches.

These and other features, aspects, and advantages of the disclosure are described in more detail below in the detailed description and in conjunction with the following figures.

DETAILED DESCRIPTION

Figure 1:
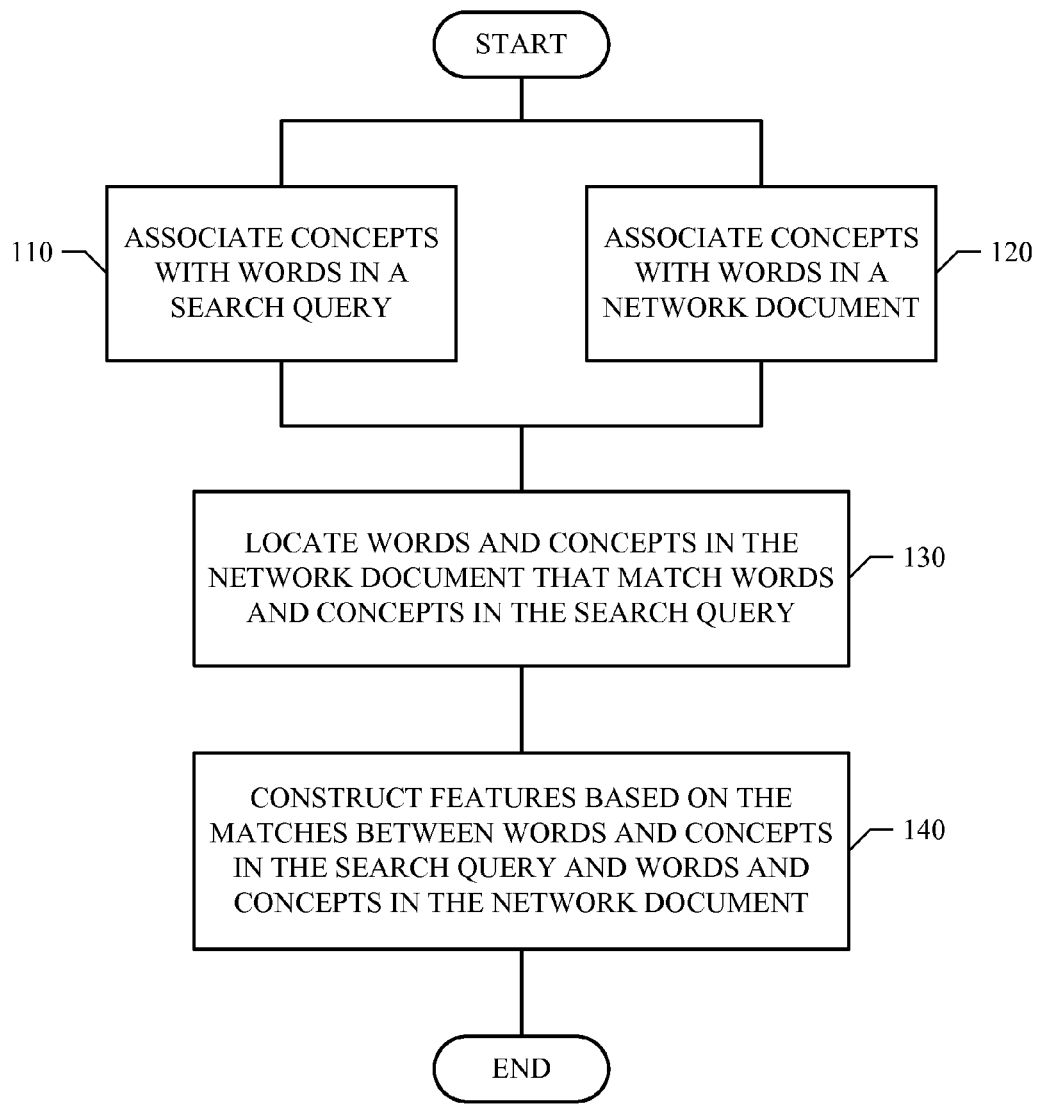
FIG. 1 illustrates an example method for incorporating query concepts and document concepts to network search.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A search engine is a computer-implemented tool designed to search for information on a network, such as the Internet or the World Wide Web. To conduct a search, a network user may issue a search query to the search engine. In response, the search engine may identify one or more network resources that are likely to be related to the search query, which may collectively be referred to as a "search result" identified for the search query. The network resources are usually ranked and presented to the network user according to their relative degrees of relevance to the search query. The search engine typically implement various algorithms, such as search algorithms, ranking algorithms, etc. to perform the various functionalities involved in generating the search results for the search queries.

A search query generally contains one or more words that describe the specific information a network user wishes to locate. For example, if one network user wishes to find information concerning the first president of the United States, he may issue a search query "president George Washington" to a search engine. If another network user wishes to locate Italian restaurants in San Francisco, she may issue a search query "San Francisco Italian restaurants" to a search engine. The first example search query contains three words, and the second example search query contains four words. Hereafter, let q denote a search query, and $w_i^q$ denote a word contained in q. Then, $q=\{w_1^q, w_2^q, \ldots, w_{n_q}^q\}$, where $n_q$ is the number of words contained in q and $n_q \geq 1$.

To identify network documents that may be relevant to a search query, the search algorithms implemented by the search engine may compare and match the words in the search query to the words in each network document. A network document may also contain one or more words. However, a network document generally contains more words than a search query. Hereafter, let d denote a network document, and $w_j^d$ denote a word contained in d. Then, $d=\{w_1^d, w_2^d, \ldots, w_{n_d}^d\}$, where $n_d$ is the number of words contained in d and $n_d \geq 1$.

If a network document contains all the words in a search query (i.e., $q \subseteq d$), the search algorithms may identify the network document as a "match" or a "hit" for the search query and include the network document as a part of the search result generated for the search query. In other words, when a network document contains all the words in a search query, the search engine may consider the network document to be relevant to the search query. Matching the words in a search query with the words in a network document may be called "text matching".

Consider the example search query "president George Washington". Suppose a first example network document contains the following:

. . .
George Washington (Feb. 22, 1732-Dec. 14, 1799) was the commander of the Continental Army in the American Revolutionary War (1775-1783) and served as the first President of the United States of America (1789-1797). For his central role in the formation of the United States, he is often referred to as the father of his country.
. . .

Because the first example network document contains all three words, "president", "George", and "Washington", in the example search query, the search algorithms may consider the first example network document as a hit for the example search query "president George Washington" and include the first example network document in the search result for the example search query.

However, merely matching the words in the search queries with the words in the network documents often produces undesirable search results. Suppose a second example network document contains the following:

. . .
All charges against George Obama, half-brother to U.S. President Barack Obama, have been dropped after his arrest in a drug raid, according to police in Kenya. He was released on Saturday hours later, police added. Obama was arrested in a Nairobi slum, and he was picked up with people who possessed marijuana, said police spokesman Eric Kiraithe.
. . .
Egypt's President Hosni Mubarak is visiting Washington, D.C., for the first time in more than five years to meet with President Barack Obama, who will try to restore Egypt as an ally in the effort to forge an elusive peace among Israel and Arabs.
. . .

The second example network document also contain all three words in the example search query "president George Washington", although its content is completely unrelated to the first president of the United States. Yet, simple word matching may result in the second example network document to be included in the search result for the example search query "president George Washington" as well, which is in fact a mistake.

To reduce the frequency of such types of mistakes, in particular embodiments, a search engine may extract one or more concepts represented by the words contained in the search queries and use the query concepts to further improve the qualities of the search results generated for the search queries. By analyzing the concepts represented by the query words when determining whether a network document contains the words in a search query and thus is a match for the search query (i.e., whether a network document is relevant to the search query) the search engine not only considers the existence of the individual query words in the network document but analyzes the meaning or the content of the query words as well.

Again, consider the example search query "president George Washington". Among the three words in the example search query, "president" is a position or a title, and "George Washington" is a person's name. Thus, the three words represent two different query concepts. In particular embodiments, each query concept may place one or more constraints when determining whether a network document contains the query words representing the query concept.

For example, a person's name contained in a search query typically should have an exact match in a network document for the network document to be considered to contain the person's name. This criterion may be represented as a proximity constraint where the words representing a person's name (i.e., a person-name query concept) in the search query should locate next to each other in a network document and in the same order as they appear in the search query in order for the network document to be considered to contain the person's name. Thus, with respect to query words "George Washington" that represent the name of the first president of the United States in the example search query "president George Washington", the first example network document contains the president's name while the second example network document does not. Although the second example network document contains both query words "George" and "Washington", the two query words are not located next to each other. Thus, the second example network document does not satisfy the proximity constraint required for the query words representing the person-name query concept. In this case, the search engine may not include the second example network document in the search result generated for the example search query "president George Washington".

In particular embodiments, there may be a predetermined set of query concepts. For example and without limitation, query concepts may include person name, business name, business address, business category, brand name, street, city, county, state, province, country, product name, product category, book title, audio title, video title, image title, etc. The present disclosure contemplates any suitable or applicable query concepts.

Particular embodiments may parse each search query and extract one or more of the predetermined query concepts represented by the query words. Note that not every word in a search query may represent a predetermined query concept. Particular embodiments may ignore those query words that do not represent any predetermined query concept. For example, in example search query "president George Washington", there may not be a predetermined query concept for a title or a position. Thus, the query word "president" may not represent any query concept. On the other hand, there may be a predetermined query concept for a person's name. Thus, the query words "George Washington" may represent a persons-name query concept. Particular embodiments may mark query word "George" as the beginning word of the person-name query concept (e.g., George: B-person_name, where "B" indicates the beginning word and "person_name" represents the person-name query concept) and query word "Washington" as the ending word of the person-name query concept (e.g., Washington: E-person_name, where "E" indicates the ending word and "person_name" represents the person-name query concept). A query word that does not represent any predetermined query concept may be marked as representing "null concept".

Each query concept may place one or more constraints when determining whether a network document contains the corresponding query words representing the query concept, and different query concepts may place different constraints.

For example, different query concepts may place different proximity constraints when determine whether a network document contains the corresponding query words representing the query concepts. As described above, the person-name query concept may place tight proximity constraint on the words forming a person's name such that the words forming a person's name not only need to exist in a network document but may need to locate next to each other and in the same order as they appear in the search query in order for the network document to be considered to contain the person's name. Similarly, a city query concept may place tight proximity constraint on the words forming a city's name. For example, parsing the example search query "San Francisco Italian restaurants", the query words "San Francisco" may be determined to represent a city query concept. In order for a network document to be considered to contain the two query words "San" and "Francisco", the two query words not only need to exist in the network document but also need to be located next to each other with the word "San" in front of the word "Francisco".

On the other hand, a business-category query concept may place relatively looser proximity constraint on the words representing a business category. In the example search query "San Francisco Italian restaurants", the two query words "Italian restaurants" may be parsed as a business category and representing the business-category query concept. A network document may be related to Italian restaurants and yet may not necessarily place the two words next to each other. For example, suppose a third example network document contains the following:

. . .
Family owned and operated restaurants serving fresh, authentic Italian food, for parties of two or two hundred. Visit our dinning rooms in San Francisco Mission District or Fisherman's Wharf seven days a week.
. . .

Although the two words "Italian" and "restaurants" are not located next to each other in the third example network document and do not appear in the same order as they are in the example search query "San Francisco Italian restaurants" (i.e., with the word "Italian" in front of the word "restaurants"), the third example network document may nevertheless be considered to contain the query words "Italian restaurants" if the proximity constraint placed by the business-category query concept requires that the words representing a business-category query concept only need to be close to each other (e.g., located within the same paragraph or within 10 words of each other).

Different query concepts may place different distribution constraints when determine whether a network document contains the corresponding query words representing the query concepts. A network document may contain one or more sections, such as a title section, a body section, a footnote section, etc., and each section may contain one or more words. When determining whether the network document contains the words in a search query, the query words may be found in any section of the network document. A query concept may indicate in which section of a network document the corresponding query words representing the query concept may be found. For example, the business-name query concept may indicate that it is more preferable for the query words representing a business name to be found in the title section than in the body section of a network document. Consider an example search query "Bloomingdale's stores". The query word "Bloomingdale's" represents a business-name query concept. When determining whether individual network documents contain the query word "Bloomingdale's", if one network document contains the word "Bloomingdale's" in its title section (e.g., Bloomingdale's home page) while another network document contains the word "Bloomingdale's" in its body section (e.g., a web page reviewing several department stores, including Bloomingdale's), the former network document may be considered a better match than the latter network document based on the distribution constraint associated with the business-name query concept.

Sometimes, a word may have different meanings and representing different concepts depending on the context in which it is placed. For example, the word "Washington", by itself, may be the surname of the first president of the United States, a state on the West Coast of the United States, or the capital city of the United States. Thus, the example search query "president George Washington" may be parsed as: (1) "president": null concept; "George Washington": person name; (2) "president": null concept; "George": person name; "Washington": state; or (3) "president": political position; "George": person name; "Washington": city. Such ambiguities in the query concepts may result in a search engine mistakenly including network documents having no relevance or little relevance to a search query in the search result generated for the search query.

For example, suppose a network user is searching for electricians in the city of Kirkwood, Mo. where he lives. The network user may issue a search query "electricians in Kirkwood" to a search engine. However, the word "Kirkwood" may also be a business name or a brand name. Parsing this example search query may determine that the word "Kirkwood" represents a city query concept or a business-name query concept. The city query concept may place a tight proximity constraint on the words representing the city's name. However, in this case, there is only one word representing the city's name. Thus, the proximity constraint may have little practical effect. Suppose there is a business called "Kirkwood Electricians" located in Dallas, Tex. that has a website "www.kirkwoodelectricians.com". Even if the search engine correctly identifies the query word "Kirkwood" as representing a city query concept, the home page of the business "Kirkwood Electricians" may still be considered as containing the words in the example search query "electricians in Kirkwood" because the proximity constraint associated with the city query concept may still be satisfied. Consequently, the search engine may include the home page of the business "Kirkwood Electricians" in the search result generated for the example search query "electricians in Kirkwood", which is again a mistake.

To reduce the frequency of such types of mistakes, in particular embodiments, a search engine may extract one or more concepts represented by the words in the network documents as well as concepts represented by the words in the search queries and use the document concepts together with the query concepts to further improve the qualities of the search results generated for the search queries. In particular embodiments, when determining whether a network document contains the words in a search query, the search engine not only considers the existence of the individual query words in the network document (i.e., text matching) but requires that the concepts represented by the query words are similar to or match the concepts represented by the corresponding words in the network document in order to consider that the network document contains the query words. While matching the words in a search query with the words in a network document may be called "text matching", matching the concepts represented by the words in the search query with the concepts represented by the words in the network document may be called "semantic matching". Consequently, process of matching both the words and the concepts represented by the words between a search query and a network document may be referred to as "semantic-text matching".

FIG. 1 illustrates an example method for incorporating both query concepts and document concepts in network search. Although the steps illustrated in FIG. 1 are described with respect to one search query and one network document, the same concept may be applied to multiple pairs of search query and network document.

In particular embodiments, a search query may be parsed so that the words in the search query are associated with the query concepts, as illustrated in step 110. As described above, there may be a predetermined set of query concepts, and a query word may be associated with a predetermined query concept. Associating a query concept with a query word may also be referred to as "tagging" a query word with a query concept. In practice, sometimes a query word may not have a corresponding predetermined query concept. For example, the word "president" in example search query "president George Washington" or the word "in" in example search query "electricians in Kirkwood" may not have any corresponding predetermined query concept. In particular embodiments, any query word that does not have a predetermined query concept may be associated with a "null" query concept.

The following TABLE 1 illustrates several example search queries having their words associated with predetermined query concepts. Each query concept may be represented by one or more query words. Particular embodiments use a concept notation to tag each query word and indicate the query concept the query word represents. If a query word is the beginning word (i.e., the first word) of a query concept, it is marked with "B" (for "beginning") followed by the query concept. If a query word is a middle word of a query concept, it is marked with "I" (for "intermediate") followed by the query concept. If a query word is the ending word (i.e., the last word) of a query concept, it is marked with "E" (for "ending") followed by the query concept. If a query concept is represented by a single query word, then that query word is marked with "B" followed by the query concept. If a query word does not represent any predetermined query concept, it is marked with "O" (for null query concept). The concept notation associated with each query word may be referred to as a "concept tag" or a "meta-word".

TABLE 1

Example Search Queries with Query Concept Tags

| Query Word | Query Concept Tag |
| --- | --- |
| president | O |
| George | B-person_name |
| Washington | E-person_name |
| San | B-city |
| Francisco | E-city |
| Italian | B-business_category |
| restaurants | E-business_category |
| electricians | B-business_category |
| in | O |
| Kirkwood | B-city |
| Bloomingdale's | B-business_name |
| stores | O |

In particular embodiments, a network document may be parsed so that the words in the network document are associated with document concepts, as illustrated in step 120. In particular embodiments, there may be a predetermined set of document concepts. For example and without limitation, document concepts may include person name, business name, location, etc. The present disclosure contemplates any suitable or application document concepts. Note that the predetermined query concepts and the predetermined document concepts are not required to have the same resolution or granularity in terms of the specificity of the concepts. In particular embodiments, the predetermined document concepts may have lower resolution than the predetermined query concepts. The predetermined query concepts may have many specific categories (i.e., higher resolution). For example, the predetermined query concepts may have different and specific types of location concepts, such as street, city, county, state, country. On the other hand, the predetermined document concepts may only have one location concept that covers all types of locations (i.e., lower resolution). Alternatively, in particular embodiments, the predetermined document concepts and the predetermined query concepts may have the same or similar level of resolution. the predetermined document concepts may have specific categories as well.

A document word may be associated or tagged with a predetermined document concept. In practice, often a document word may not have a corresponding predetermined document concept. In particular embodiments, any document word that does not have a corresponding predetermined document concept may be associated with a "null" document concept.

In particular embodiments, a search engine may implement a query semantic parser or a document semantic parser, also called a concept tagger, to automatically parse and concept tag the words in the search query or the network document respectively. The query or document semantic parser may be based on a mathematical model, such as, without limitation, conditional random field (CRF, a discrimination probabilistic model often used for the labeling or parsing of sequential data), hidden Markov model (HMM, a statistical model often used in temporal pattern recognition applications), finite state machine (FSM), maximum entropy model, etc. The present disclosure contemplates any suitable or application mathematical models. The mathematical model implemented by the query or document semantic parser may be trained using appropriate training data.

In practice, concept tagging a search query may differ greatly from concept tagging a network document because a search query and a network document often have very different characteristics. For example, a search query usually only contains a few words (i.e., short), where as a network document often contains hundreds or thousands of words (i.e., long). A search query often does not comply with grammatical rules precisely, where as a network document generally follows grammatical rules. A search query may not include prepositional words (e.g., in, at, on, of, etc.), where as a network document may include many prepositional words. A search query may not observe proper capitalizations, where as a network document does. Therefore, the query semantic parser may process a search query differently from the way the document semantic parse processes a network document. Even if the same mathematical model is used for concept tagging both the search queries and the network documents, the underlying mathematical model may be trained differently using different training data so that it analyzes the query characteristics and document characteristics differently.

In particular embodiments, the words in each network document are inverted indexed. Generally, within the context of information technology, an inverted index (also referred to as "postings file" or "inverted file") is an index data structure that stores a mapping from content, such as words or numbers, to its locations in a database file, or in a document or a set of documents, thus allowing full text search. Inverted indexing the words in the network documents enables a search engine to search for the individual words contained in the individual network documents. A search engine may inverted index the words in a network document by recording the locations of the words within the network document counting from the beginning of the network document. For example, the first word in a network document may have an index of 1; the second word in the network document may have an index of 2; the third word in the network document may have an index of 3; and so on. Sometimes, a word may appear multiple times in the same network document (e.g., prepositional words, keywords, etc.). Such word may have multiple indices indicating the multiple positions it appears in the network document. For example, the 5th, 52nd, and 134th word in a network document may all be the word "president". In this case, the word "president" may have indices 5, 52, and 134. The following TABLE 2 illustrates the indices of a few words in the first example network document.

TABLE 2

Example Document Words with Inverted Indices

| Document Word | Index |
|---|---|
| George | 1 |
| Washington | 2 |
| ... | ... |
| commander | 11 |
| of | 12 |
| ... | ... |
| president | 28 |
| of | 29 |
| the | 30 |
| United | 31 |
| States | 32 |
| of | 33 |
| America | 34 |
| ... | ... |

In practice, because a network document may contain hundreds or thousands of words, and there may be millions or billions of network documents available on the Internet, inverted indexing the words in all the network documents available on the Internet require a great amount of memory.

Associating document concepts to the individual words in the network documents means that the document concept tags identifying the document concepts need to be recorded along with the document words so that a search engine may use these document concept tags when performing the search operations. A simple way to record the document concept tags is to associate each word in a network document with its document concept tag, similar to the way each query word is marked with its query concept tag as illustrated in TABLE 1. The following TABLE 3A illustrates a few words in the first example network document, each with an index and a document concept tag. The same concept notation used to tag the example query words as illustrated in TABLE 1 is used to tag the example document words. The words illustrated in TABLE 3A represent two document concepts: (1) "George Washington" representing a person name; and (2) "the Untied States of America" representing a location.

TABLE 3A

Example Document Words with Inverted Indices and Concept Tags

| Document Word | Index | Document Concept Tag |
|---|---|---|
| George | 1 | B-person_name |
| Washington | 2 | E-person_name |
| ... | ... | ... |
| commander | 11 | O |
| of | 12 | O |
| ... | ... | ... |
| president | 28 | O |
| of | 29 | O |
| the | 30 | B-location |
| United | 31 | I-location |
| States | 32 | I-location |
| of | 33 | I-location |
| America | 34 | E-location |
| ... | ... | ... |

As shown in TABLE 3A, associating each document word with a concept tag requires additional memory. Considering the great number of network documents available on the Internet and the large number of words contained in each network document, the concept tagging method illustrated in TABLE 3A results in a significant amount of additional memory needed for recording the document concept tags. Furthermore, the majority of the words in the network documents may not represent any predetermined document concepts, and thus are marked with "O", representing the null concept tag. Empirical data suggest that about 1% of the words in the network documents represent person names, less than 1% of the words in the network document represent business names, and less than 1% of the words in the network document represent locations. Overall, less than 3% of the words in the network document may represent document concepts that may be useful to a search engine. Therefore, the method to record concept tags with document words illustrated in TABLE 3A wastes a great amount of valuable memory space and is very inefficient in memory usage.

In particular embodiments, instead of associating each and every word in a network document with a concept tag, as illustrated in TABLE 3A, only those words in the network document that actually represent predetermined document concepts are associated with appropriate document concept tags. In particular embodiments, a document concept tag associated with a document word has the same index as the document word itself. The words in the network document that do not represent any predetermined document concept are not associated with any concept tag. For example, suppose in the third example network document, the word "Francisco" is the 42nd word from the beginning of the network document. Thus, the word "Francisco" has an inverted index of 42. Further suppose that parsing the third example network document determines that the word "Francisco" at position 42 represents the location document concept. A location document concept tag may then be assigned an index of 42 to record the concept represented by the word "Francisco" at position 42.

The following TABLE 3B illustrates the few words in the first example network document illustrated in TABLE 3A, where concept tags associated with the document words have the same inverted indices as the corresponding document words. In this example, the indicator "type" is used to signify that the entry is a concept tag, not a document word. Other suitable indicators may also be used to separate document words from concept tags.

TABLE 3B

Example Document Words with Indices and Concept Tags with Indices

| Document Word and Document Concept Tag | Index |
|---|---|
| George | 1 |
| type: person_name | 1 |
| Washington | 2 |
| type: person_name | 2 |
| ... | ... |
| commander | 11 |
| of | 12 |
| ... | ... |
| president | 28 |
| of | 29 |
| the | 30 |
| type: location | 30 |
| United | 31 |
| type: location | 31 |
| States | 32 |
| type: location | 32 |
| of | 33 |
| type: location | 33 |
| America | 34 |
| type: location | 34 |
| ... | ... |

In TABLE 3B, the first word "George" represents the person-name document concept. Thus, an entry is inserted after the entry for the word "George" having "type: person_name" that represents the person-name document concept and an index of 1, which is the same index as the word "George". In other words, a document word and its associated document concept tag both have the same index number. The 11th word "commander" does not represent any predetermined document concept. Thus, there is no entry for a document concept tag inserted after the entry for the word "commander".

Comparing the two methods of recording document concept tags associated with the document words illustrated in TABLES 3A and 3B, it may be shown that the method illustrated in TABLE 3B requires much less memory to store the document words with their indices and document concept tags than the method illustrated in TABLE 3A. In the case of TABLE 3A, a whole additional column is needed for each network document for recording the document concept tags associated with all the words in the network document. In contrast, in the case of TABLE 3B, only a few additional rows are needed for each network document for recording the document concept tags associated with only those few words in the network document that represent the predetermined document concepts.

To determine whether a network document is relevant to a search query, in particular embodiments, the search engine retrieves the words and document concepts in the network document that match the words and query concepts in the search query, as illustrated in step 130. Suppose the words in the search query have been concept tagged as illustrated in step 110, and the words in the network document have been inverted indexed and concept tagged as illustrated in step 120. In particular embodiments, for each word having a query concept in the search query, the search engine retrieves all the indices of the same word in the network document and all the indices of the document concept that is the same as or similar to the query concept in the network document. If an index of the word in the network document is the same as the index of the document concept in the network document, then particular embodiments may consider that the network document contains the query word having the query concept. If a query word does not represent any predetermined query concept, then the network document is considered to contain the query word if the query word, by itself, is found in the network document.

Consider the example search query "president George Washington" and the first example network document. Suppose the search engine needs to determine whether the first example network document contains the three words in the example search query "president George Washington". As illustrated in TABLE 1, the word "president" is not associated with any query concept tag. The word "George" and the word "Washington" are each associated with a person-name query concept tag.

To determine whether the first example network document contains the word "president", particular embodiments may retrieve all the indices associated with the word "president" in the first example network document. Since the word "president" is not associated with any query concept tag, it is not necessary to retrieve indices associated with any document concept tag. The word "president" may appear at multiple positions in the first example network document, and so it may have multiple indices. Suppose the word "president" has indices 28, 94, 134, 167, and 381 in the first example network document (i.e., the word "president" appears five times in the first example network document at the 28th, the 94th, the 134th, the 167th, and the 381st positions from the beginning of the first example network document). Thus, the first network document contains five instances of the word "president".

To determine whether the first example network document contains the word "George", particular embodiments may retrieve all the indices associated with the word "George" and all the indices associated with the person-name document concept tag in the first example network document, since the word "George" is associated with a person-name query concept tag. Note that in this case, there is a person-name query concept and a person-name document concept. Particular embodiments may consider that the person-name document concept corresponds to the person-name query concept.

Again, the word "George" may appear at multiple positions in the first example network document. Similarly, the person-name document concept tag may appear at multiple positions in the first example network document. Furthermore, the positions of the person-name document concept tag may not always coincide with the positions of the word "George". Suppose the word "George" has indices 1 and 248, and the person-name document concept tag has indices 1, 2, 14, 18, 57, 134, 176, 248, 342, and 481 (i.e., the document words at positions 1, 2, 14, 18, 57, 134, 176, 248, 342, and 481 are each tagged with the person-name document concept tag).

Comparing the indices of the word "George" and the indices of the person-name document concept tag, indices 1 and 248 belong to both the indices of the word "George" and the indices of the person-name document concept tag, which indicates that at positions 1 and 248 in the first example network document, the word is "George" and the document concept tag associated with that word is "person-name". Thus, there are two positions in the first example network document where the word "George" having the person-name document concept tag appears (i.e., the first example network document contains two instances of the word "George" having the person-name document concept tag).

To determine whether the first example network document contains the word "Washington", particular embodiments may retrieve all the indices associated with the word "Washington" and all the indices associated with the person-name document concept tag in the first example network document, since the word "Washington" in the search query is also associated with a person-name query concept tag. Suppose the word "Washington" has indices 2, 18, 32, 155, 342, and 481, and the person-name document concept tag has indices 1, 2, 14, 18, 57, 134, 176, 248, 342, and 481. Comparing the indices of the word "Washington" and the indices of the person-name document concept tag, at positions 2, 18, 342, and 481 in the first example network document, the word is "Washington" and the document concept tag associated with that word is person-name document concept tag. Thus, there are four positions in the first example network document where the word "Washington" having the person-name document concept tag appears (i.e., the first example network document contains four instances of the word "Washington" having the person-name query concept tag).

Note that the word "Washington" also appears at positions 32 and 155 in the first example network document but the person-name document concept tag does not. This suggests that although the word "Washington" appears at positions 32 and 155, the document concept tags associated with the word "Washington" at positions 32 and 155, if any, are not person-name document concept tag (e.g., the word "Washington" at positions 32 and 155 may refer to the capital, not the first president, of the United States). Because the document concept tags at positions 32 and 155 in the first example network document do not match the query concept tag associated with the query word "Washington", the search engine may not consider the first example network document contain the word "Washington" having the person-name query concept tag at positions 32 and 155.

Consider the example search query "San Francisco Italian restaurants" and the third example network document. Suppose the search engine needs to determine whether the third example network document contains the four words in the example search query "San Francisco Italian restaurants".

Predetermined query concept tags and predetermined document concept tags may have different granularities. For the example search query "San Francisco Italian restaurants", as illustrated in TABLE 1, the query words "San" and "Francisco" are each associated with a city query concept tag, and the query words "Italian" and "restaurants" are each associated with a business-category query concept tag. For the third example network document, the document words "San" and "Francisco" may each be associated with a location document concept tag. For the two words "San" and "Francisco", the query concept tag "city" obtained from parsing the example search query is more specific than the document concept tag "location" obtained from parsing the third example network document. However, a city is also a location. In this case, particular embodiments may consider that the location document concept corresponds to the city query concept. Similarly, particular embodiments may consider that the location document concept corresponds to any specific types of location query concepts, such as street query concept, county query concept, state query concept, country query concept, etc. Thus, the location document concept tag may be considered as equivalent to the city query concept tag.

Consequently, to determine whether the third example network document contains the words "San" and "Francisco", particular embodiments may retrieve all the indices associated with the word "San", all the indices associated with the word "Francisco", and all the indices associated with the location document concept tag in the third example network document. If the indices indicate that there are positions in the third example network document where the word "San" coincides with the document location concept tag and there are positions in the third example network document where the word "Francisco" coincides with the location document concept tag, the search engine may consider the third example network document to contain the words "San" and "Francisco" each having the cit query concept tag at those positions.

When matching words in a network document (i.e., document words) with words in a search query (i.e., query words), particular embodiments may take into consideration of the synonyms of the individual document words or the individual query words, including various types of variations (e.g., spelling variations). For example, "CA", "Calif", or "California" may be spelling variations of the same state name. If a search query includes the word "CA", this query word may be matched to the word "California" included in the network document. In another example, the words "brave", "courageous", "heroic", "gallant", and "valiant" all represent a similar concept and may be considered as synonyms with each other. If a search query includes one of these adjectives (e.g., "brave"), this query word may be matched to any of the other adjectives that are synonyms to the query word "brave" included in the network document.

Utilizing both the query concept and the document concept may help improve the qualities of the search results generated for the search queries. Consider the example search query "electricians in Kirkwood" and the home page of the example business named "Kirkwood Electricians" located in Dallas, Texas. Utilizing only the query concept, the query word "Kirkwood" denoting a city name may be tagged with a city query concept tag and may be matched to the document word "Kirkwood" denoting a business name contained in the home page of the example business "Kirkwood Electricians", which is in fact a mismatch. However, utilizing both the query concept and the document concept, the query word "Kirkwood" denoting a city name may be tagged with a city query concept tag and the document word "Kirkwood" denoting a business name may be tagged with a business-name document concept tag. Since the query concept tag (i.e., city) associated with the query word "Kirkwood" does not match with the document concept tag (i.e., business name) associated with the document word "Kirkwood", the search engine may not consider that the home page of the example business "Kirkwood Electricians" contains the query word "Kirkwood" having a city query concept tag and consequently may not include the home page of the example business "Kirkwood Electricians" in the search result generated for the example search query "electricians in Kirkwood".

In particular embodiments, the search engine uses a "Joint" operator in the Query Executive Driver (QED) implemented by the search engine. Given a query word, $w_i^q$, and a query concept tag, denoted by $c_i^q$ associated with $w_i^q$, the "Joint"

operator performs a logical "JOINT" operation (i.e., joining) on the query word and the associated query concept tag as $[w_i^q, \text{type:}c_i^q]$. For example, for the query word "Washington" and the person-name query concept tag, the "Joint" operator results in [washington, type:person-name]. In particular embodiments, the Joint" operator is applied to each word in a search query that has an associated query concept tag and causes the indices of the query word itself and the indices of the document concept tag corresponding to the query concept tag to be retrieved from a network document.

In particular embodiments, a search engine may identify multiple network documents for each search query. The network documents may be ranked according to their relative degrees of relevance with respect to the search query, such that a network document that is relatively more relevant to the search query is ranked higher and consequently presented before a network document that is relatively less relevant to the search query. In particular embodiments, the search engine may implement one or more ranking algorithms. To rank the network documents identified for a search query, a ranking algorithm may take as input various features determined from the search query and the network documents and determine the ranking for the network documents based on these features. There may be many different types of features, and the present disclosure contemplates any appropriate features.

In particular embodiments, for a search query and a set of network documents identified for the search query, particular embodiments may determine the positions in each of the network documents at which each of the word in the search query appears and the positions in each of the network documents that have document concept tags corresponding to the query concept tags represented by the query words, as illustrated in steps 110, 120, and 130. Particular embodiments may construct one or more features based on the position information and apply these features to the ranking algorithm, as illustrated in step 140. The ranking algorithm may then use these features, together with other features, to rank the network documents for the search query. For example, if one network document contains ten instances of a query word with the associated query concept tag and another network document contains five instances of the same query word with the associated query concept tag, the ranking algorithm may consider the former network documents more relevant to the search query than the latter network documents.

Although utilizing both the query concept and the document concept may help prevent some types of mistakes when determining whether a network document contains the words in a search query, it may not be able to solve other types of problems, such as term variations, boundary variations, and concept variations. A term variation may occur when a subject matter may be referred to by words in different forms. For example, both "New York City" and "NYC" may refer to the same city, or both "San Francisco International Airport" and "SFO" may refer to the same airport. A boundary variation may occur when a subject matter may be referred to by different number of words. For example, both "New York" and "New York City" may refer to the same city. A concept variation may occur when a group of words may represent different concept. For example, "New York" may refer to a city or a state, or "Kirkwood" may refer to a business name or a city.

In particular embodiments, the qualities of the features constructed may depend on the accuracy of the query or document semantic parser implemented by the search engine because the quality of semantic-text matching often depends on the quality of the underlying query and document semantic parsers that semantically parse the search queries and the network documents. Errors made by the query or document semantic parsers when extracting concepts from the search queries or the network documents may become a major source of error for the search engine. The errors may become prohibitive especially when the search engine utilizes both query concepts and document concepts. Intuitively, if a query semantic parser has an accuracy of x % and a document semantic parser has an accuracy of y %, the accuracy of the system semantic parser for a search engine is approximately x %×y %. In practice, a query semantic parser may have an accuracy of approximately 70% and a document semantic parser may have an accuracy of approximately 50%, which yield the accuracy of the system semantic parser to be approximately 35%, a fairly low accuracy level.

The accuracy of a query or document semantic parser may be influenced by different factors. A factor that may influence the accuracy of the query semantic parser may be that sometimes, a word may have different meanings and represent different concepts depending on the context in which the word is placed. Consider an example search query "santa cruz lounge". The three query words in this example search query may be interpreted by the query semantic parser as: (1) "santa cruz": brand name; "lounge": product name; or (2) "santa cruz": city; "lounge": business category. With only the search query itself, it may be difficult to determine which interpretation of the three query words is correct and agrees with the intent of the network user issuing the search query to the search engine.

Figure 2:
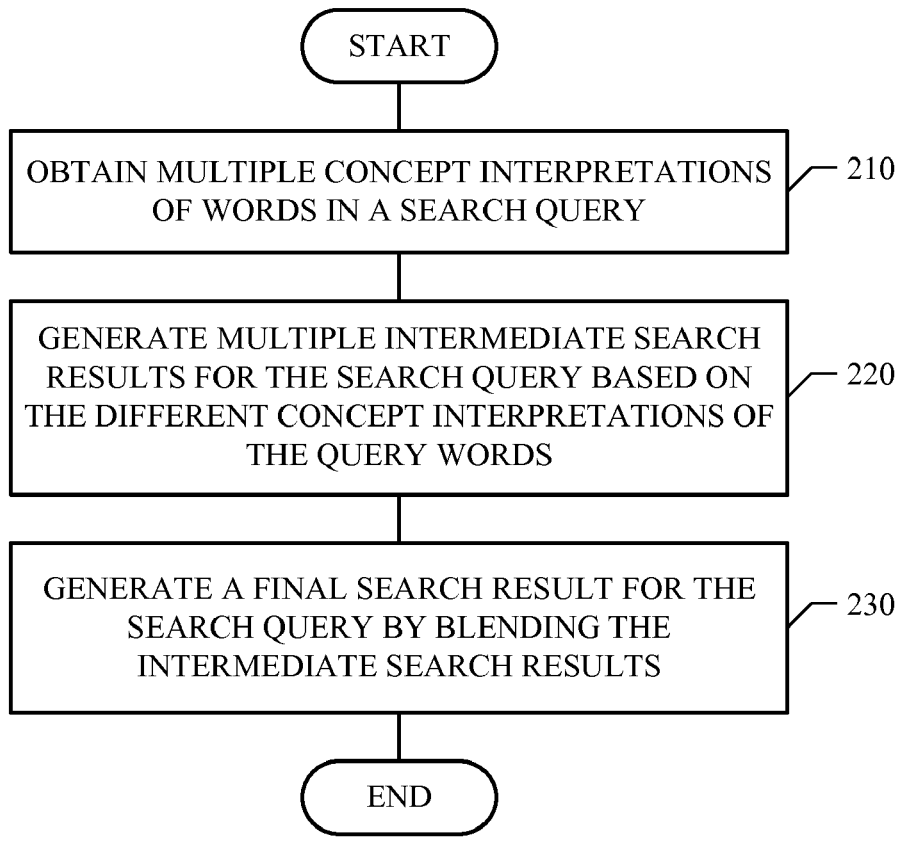
FIG. 2 illustrates an example method for utilizing multiple interpretations of query concepts for a search query in network search.

To cope with this type of word-meaning ambiguity problem, in particular embodiments, a search engine may consider multiple concept interpretations of a search query. FIG. 2 illustrates an example method for utilizing multiple interpretations of query concepts for a search query in network search. In particular embodiments, a search engine may employ multiple query semantic parsers, each providing a different concept interpretation of the words in the search query and especially those query words having multiple possible meanings, or one query semantic parser may be trained to provide different concept interpretations of the query words, as illustrated in step 210. For each interpretation of the search query, the search engine may generate a different intermediate search result based on the steps illustrated in FIG. 1 (i.e., constructing different sets of features to apply to the ranking algorithm, which results in the ranking algorithm ranking the network documents differently), as illustrated in step 220. The multiple intermediate search results based on the different interpretations of the search query may be blended to generate a final search result for the search query, as illustrated in step 230. The blending of the multiple intermediate search results may be inter-leaved or slotted. As a result, text matching in a search engine may be much less sensitive to query side semantic parsing ambiguities, thus help reducing the problems caused by type variations.

For example, with the example search query "santa cruz lounge", the search engine may consider both interpretations of the three query words independently. The search engine may generated a first search result for the example search query "santa cruz lounge" based on the first interpretation where "santa cruz" represents a brand name concept and "lounge" represents a product-name concept, and a second search result based on the second interpretation where "santa cruz" represents a city concept and "lounge" represents a business-category concept. The first and second search results may then be blended to produce the final search result for the example search query "santa cruz lounge".

Consider another example search query "California DMV". There may be two concept interpretations with this example search query as well: (1) "California": state; "DMV": business name, and (2) "California DMV": business name. With the first interpretation, a "Joint" operation may be applied to "California" and "DMV" independent, resulting in [california, type: state] and [dmv, type:business-name]. This may cause one set of network documents to be generated by the search engine. With the second interpretation, a "Joint" operation may be applied to "California DMV", resulting in [california dmv, type:business-name]. This may cause another set of network documents to be generated by the search engine. The two sets of network documents may then be blended to generate the final set of network document as the search result for the example search query "California DMV".

A factor that may influence the accuracy of the document semantic parser may be that document semantic parsing, in general, is more difficult and resource consuming than query semantic parsing. A network document may contain hundreds or thousands of words that may represent many concepts, whereas a search query typically contains a few words. In particular embodiments, document semantic parsing may be performed with a lower resolution, where only a few specific and distinct document concepts are considered. For example, while a predetermined set of query concepts may include many specific concepts, a predetermined set of document concepts may only include a few high-level concepts, such as, without limitation, person name, business name, and location. Lower resolution with document semantic parsing may significantly decrease the errors in document semantic parsing because it dramatically decreases decision space in the parsing task. At the same time, lower resolution with document semantic parsing may also improve the performance of document semantic parsing, especially considering that each network document often contains hundreds or thousands of words. For example, instead of determining words in a network document that represent specific concept types "street", "city", "county", "state", and "country" (e.g., as in the case of query semantic parsing, which may be performed with a higher resolution), document semantic parsing may only determine words in a network document that represent a more generalized concept type "location", which may include any specific type of location. In particular embodiments, a lower resolution in document semantic parsing does not decrease the matching resolution because query semantic parsing is performed with a higher resolution that identifies detailed and specific query concepts and text matching may confirm the semantic match.

For example, with an example search query "high schools in San Jose", performing query semantic parsing with a higher resolution may identify the query words "San Jose" as representing a "city" concept. On the document side, as along as the words "San Jose" in a network document are identified as representing a "location" concept by the document semantic parsing, the text matching between the query words "San Jose" and the document words "San Jose" may be semantic valid without further knowing whether the document words "San Jose" specifically represent a street, a city, or a state.

Figure 3:
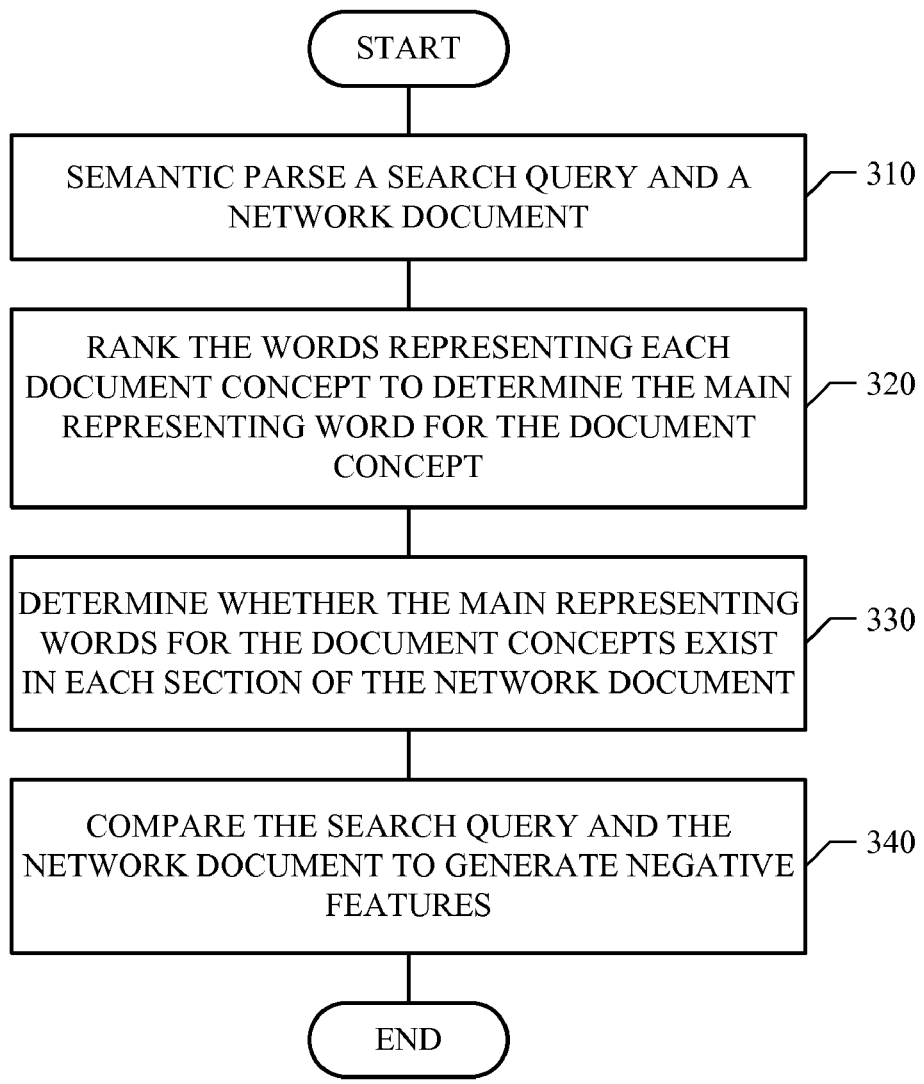
FIG. 3 illustrates an example method for constructing negative features that may be used in network search.

Currently, the search engines are generally concerned with positive features (i.e., text or semantic matches between words in a search query and words in a network document). However, negative features (i.e., text or semantic mismatches or extra-matches between words in a search query and words in a network document) sometimes are as important as positive features when determining the level of relevance a network document is to a search query. FIG. 3 illustrates an example method for constructing negative features to be applied to a ranking algorithm implemented by a search engine. Although the steps illustrated in FIG. 1 are described with respect to one search query and one network document, the same concept may be applied to multiple pairs of search query and network document.

In particular embodiments, a search query is semantically parsed to determine the query concepts represented by the words in the search query, and a network document is semantically parsed to determine the document concepts represented by the words in the network document, as illustrated in step 310. Semantic parsing a search query is described above in connection with step 110 of FIG. 1; and semantic parsing a network document is described above in connection with step 120 of FIG. 1. Particular embodiments may semantic parse the search query with a high-resolution query semantic parser and semantic parse the network document with a low-resolution document semantic parser. As a result, selected words in the search query are associated with selected query concept tags representing selected predetermined query concepts; and selected words in the network document are associated with selected document concept tags representing selected predetermined document concepts. Hereafter, let $c_i^q$ denote a predetermined query concept, and let $c_j^d$ denote a predetermined document concept.

In particular embodiments, a network document may have multiple sections, and each document section may have a weight. In particular embodiments, the sections of a network document and their associated weights may be predetermined. For example and without limitation, a network document may be a title section, one or more body sections, an anchor section, etc. In particular embodiments, the weight associated with a document section may reflect the relative degree of importance that document section is in comparison to the other sections in the network document. In particular embodiments, the more important a section in the network document, the higher weight it may have. For example, the title section may be considered more important than the anchor section, and thus may have a higher weight. Hereafter, let $s_j^d$ denote a predetermined section in a network document, and let $w_j^s$ denote the predetermined weight of $s_j^d$.

In a network document, there may be different words representing the same predetermined document concept. Consider a fourth example network document that contains a listing of businesses in Dallas, Tex. as the following:

Dallas, Tex. Yellow Pages—electricians
. . .
CAG Power Solutions
Dallas, Tex. 75236
(817) 422-8587
. . .
Harold's Service
2626 Electronic Lane, Irving, Tex. 75061
. . .
Kirkwood Electricians
950 North Beltline Road, Dallas, Tex. 75220
(210) 362-1756
. . .
Milestone Electric
Dallas, Tex. 75205
(972) 422-9030
. . .

Suppose one of the predetermined document concept is "location". The document semantic parser may associate any location related words (e.g., street, city, state, etc.) in the network document with a location document concept tag. Thus, the words "Dallas", "TX", "Irving", and "Beltline" in the fourth example network document may each be associated with the location document concept tag. At the same time, it is also possible that the document semantic parser may make a mistake and consider a word in the network document that does not really represent a location concept as a location word. Suppose, by mistake, the document semantic parser considers the word "Kirkwood" in the fourth example network document as a city name and also associates the location document concept tag with it.

For each document concept found in the network document, particular embodiments may rank the words with which the corresponding document concept tag is associated (i.e., the words that represent the document concept) to determine the main word in the network document that represents document concept, as illustrated in step 320. In the fourth example network document, the words "Dallas", "TX", "Irving", "Beltline", and "Kirkwood" (a mistake in this case) are each associated with the location document concept tag. For the location document concept, these five words may be ranked to determine the main word among the five words that represent the location document concept in the fourth example network document.

In particular embodiments, the words representing a particular document concept may be ranked base on the number of times each word appears in the network document and in which section of the network document each word appears. The words that appear more often may be ranked higher than the words that appear less often in the network document. The words that appear in the more important sections of the network document (e.g., as indicated by the weights of the document sections) may be ranked higher than the words that appear in the less important sections of the network document. In particular embodiments, for each document concept found in the network document, the words representing the document concept may be ranked based on a score calculated for each word as:

$$\text{score} = \sum_{j=1}^{j \leq n_s} (f_j^s \times w_j^s),$$

where: (1) $n_s$ is the total number of sections in the network document; (2) $f_j^s$ is the number of times (i.e., the frequency) the word appears in $s_j^d$; and (3) $w_j^s$ is the predetermined weight of $s_j^d$. The word that has the highest score among all the words representing each document concept may be selected as the main word representing the document concept. Note that if multiple document concepts are found in a network document, each document concept may have its main representing word obtained by ranking all the words in the network document representing that particular document concept. In other words, the main representing word is determined on a per-document-concept basis.

Although the steps in FIG. 3 are described according particular embodiments where each document concept found in a network document has one main representing word, the concept may be similarly applied to particular embodiments where each document concept found in a network document has more than one main representing words (e.g., each document concept has two or three main representing words). In this case, for each document concept found in a network document, all the words representing that document concept may be ranked according to their scores, and a predetermined number of the top ranking words may be considered as the main representing words for that document concept.

In the fourth example network document, the word "Dallas" may appear most frequently in the title section, body sections, and anchor section of the fourth example network document and thus may be considered as the main word that represent the "location" document concept in the fourth example network document.

For each main representing word representing each document concept, particular embodiments may determine whether that main representing word exists in each section of the network document, as illustrated in step 330. For example, suppose there are six predetermined document sections, including a title section, four body sections, and an anchor section. In the fourth example network document, the word "Dallas", which is the main word representing the "location" document concept, may exist in any one of the six predetermined document sections.

In particular embodiments, whether the main words representing the document concepts exist in each of the sections of the network document may be recorded using a data structure as illustrated in the following TABLE 4. In TABLE 4, if a cell has a value of 1 (i.e., representing TRUE), then the corresponding main representing word exists in the corresponding document section. Conversely, if a cell has values of 0 (i.e., representing FALSE), then the corresponding main representing word does not exist in the corresponding document section. For example, in TABLE 4, the main word main word representing $c_1^d$ exists in $s_1^d$, $s_j^d$, and $s_{n_s}^d$, but does not exist in $s_2^d$. Similarly, the main word representing $c_2^d$ exists in $s_2^d$ and $s_j^d$ but does not exist in $s_1^d$ and $s_{n_s}^d$.

TABLE 4

Main Representing Words' Existence in Document Sections

| Main Representing Word | Document Section | | | | |
|---|---|---|---|---|---|
| | $S_1^d$ | $S_2^d$ | ... | $S_j^d$ | ... | $S_{n_s}^d$ |
| for $C_1^d$ | 1 | 0 | ... | 1 | ... | 1 |
| for $C_2^d$ | 0 | 1 | ... | 1 | ... | 0 |
| ... | ... | ... | ... | ... | ... | ... |
| for $C_j^d$ | 0 | 0 | ... | 1 | ... | 1 |
| ... | ... | ... | ... | ... | ... | ... |

In particular embodiments, when performing semantic matching between the query concepts represented by the words in the search query and the document concepts represented by the words in the network document, only the main representing words for each document concept may be considered.

Consider the example search query "electricians in Kirkwood" and the fourth example network document. Suppose the semantic parsing of the example search query "electricians in Kirkwood" has determined that the query word "Kirkwood" represents a "city" query concept, which is correct in this case. On the other hand, suppose the semantic parsing of the fourth example network document has also determined that the document word "Kirkwood" represents a "location" document concept, which is in fact a mistake.

Without considering the main representing word for the "location" document concept, semantic-text matching of the example search query "electricians in Kirkwood" against the fourth example network document may determine that the fourth example network document contains the query word "Kirkwood" that represents a "city" query concept because the word "Kirkwood" exists in the fourth example network document and the document word "Kirkwood" has been determined to represent the "location" document concept.

On the other hand, if taking into consideration that the main representing word for the "location" document concept in the fourth example network document is in fact "Dallas", then semantic-text matching of the example search query "electricians in Kirkwood" against the fourth example network document may determine that the fourth example network document does not contain the query word "Kirkwood" that represents a "city" query concept because, while the word "Kirkwood" exists in the fourth example network document, the main representing word for the "location" document concept in the fourth example network document is not "Kirkwood" but "Dallas", and therefore, the semantic of the query word "Kirkwood" does not match the semantic of the document word "Kirkwood". By only considering the main word representing each document concept during semantic-text matching between a search query and a network document, errors caused by ambiguities in the meanings of the document words may be reduced or prevented.

In particular embodiments, the semantic-text matching between a search query and a network document may be performed on a per-document-section basis. For each section in the network document, particular embodiments may determined whether that document section contains a query word (text matching), and if so, the document concept represented by the matching document word corresponds to the query concept represented by the query word (semantic matching).

Negative semantic-text matches may be useful to a ranking algorithm in addition to positive matches. In particular embodiments, negative semantic-text matches may be used to generate negative features that may be applied to a ranking algorithm implemented by a search engine together with the positive features, as illustrated in step 340. For example, negative features may suggest to the ranking algorithm that a particular network document may have little relevance to a particular search query.

There may be different types of negative features based on different types of negative semantic-text matches. In particular embodiments, the negative features may be constructed based on mismatches. A mismatch may occur when a query concept represented by the words in a search query has a corresponding document concept, and the document words representing the corresponding document concept exist in a section of a network document but the query words representing the query concept do not exist in that same section of the network document. If $c_i^q$ and $c_j^d$ denote a corresponding pair of query concept and document concept (e.g., "city" query concept and "location" document concept), then a mismatch feature may be defined as: (I) feature equals 1 if (1) $c_i^q$ is represented by one or more query words (i.e., $c_i^q$ is found in the search query); (2) $c_j^d$ is represented by one or more document words in a section of the network document (i.e., the document words representing $c_j^d$ are found in the section of the network document, which means $c_j^d$ is found in the section of the network document); and (3) the query words representing $c_i^q$ do not exist in that same section of the network document; and (II) feature equals 0 otherwise.

In particular embodiments, the negative features may be constructed based on extra-matches. An extra-match may occur when the words in a section of a network document represent a document concept, but the query concept corresponding to the document concept is not represented by the words in a search query. If $c_i^q$ and $c_j^d$ denote a corresponding pair of query concept and document concept, then an extra-match feature may be defined as: (I) feature equals 1 if (1) $c_i^q$ is not represented by any query word (i.e., $c_i^q$ is not found in the search query); and (2) $c_j^d$ is represented by one or more document words in a section of the network document (i.e., $c_j^d$ is found in the section of the network document); and (II) feature equals 0 otherwise.

In particular embodiments, whether a particular document concept (e.g., $c_j^d$) is found in a section of a network document (e.g., $s_j^d$) may be determined based on whether the main representing document words determined for the document concept exist in the section of the network document (e.g., whether the main document words representing $c_j^d$ are contained in $s_j^d$). In particular embodiments, if the main representing document words for a document concept are not contained in a section of the network document, the document concept is considered not to exist in the document section even if there are other words in the document section that may represent the same document concept. For example, if a section of the fourth example network document contains the word "Kirkwood" or the word "Irving" but not the word "Dallas", this particular document section may be considered not to contain the "location" document concept despite the fact that the word "Kirkwood" and the word "Irving" are both considered to represent the "location" document concept and both exist in the document section. Since it has been determined that the main representing word for the "location" document concept is "Dallas" in the fourth example document, any document section that does not contain the word "Dallas" may be considered not to contain the "location" document concept.

When determining whether a query word exists in a network document or a section of a network document, particular embodiments may take into consideration of the synonyms of the query word, including various types of variations of the query word, as described above. If any synonym of the query word exists in a network document or a section of a network document (e.g., query word is "CA" and "California" exists in the network document), then particular embodiments may consider that the query word exists in the network document or the section of the network document.

In particular embodiments, the negative features, and more specifically the negative semantic features may be used by the ranking algorithm together with other features to ranking a set of network documents identified for a search query. Using semantic features for ranking network documents identified for a search query is described in more detail in U.S. patent application Ser. No. 12/360,016, entitled "System and Method for Ranking Web Searches With Quantified Semantic Features", by Yumao Lu et al., filed on Jan. 26, 2009.

Figure 4:
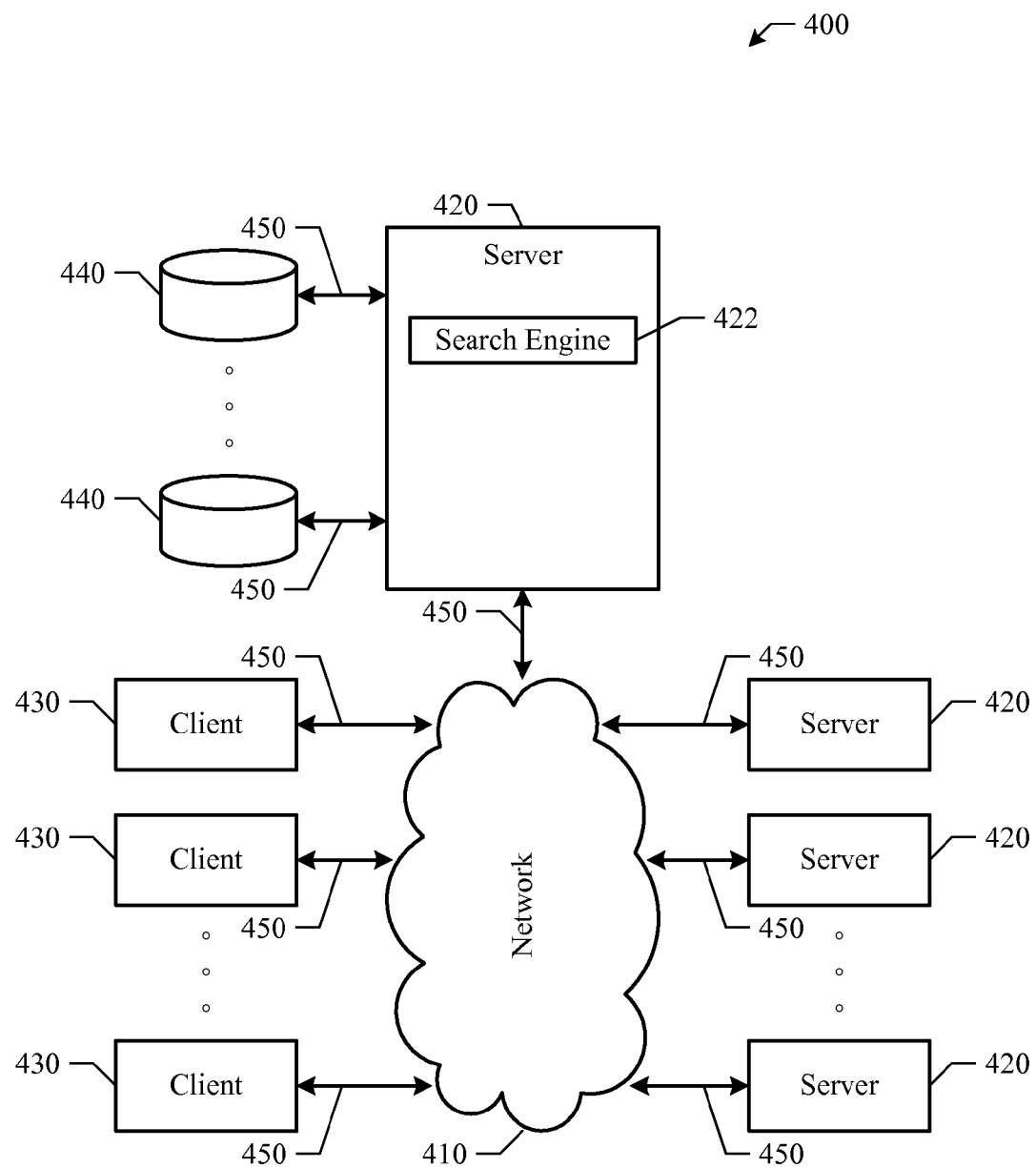
FIG. 4 illustrates an example network environment.

Particular embodiments may be implemented in a network environment. FIG. 4 illustrates an example network environment 400. Network environment 400 includes a network 410 coupling one or more servers 420 and one or more clients 430 to each other. In particular embodiments, network 410 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 410 or a combination of two or more such networks 410. The present disclosure contemplates any suitable network 410.

One or more links 450 couple servers 420 or clients 430 to network 410. In particular embodiments, one or more links 450 each includes one or more wired, wireless, or optical links 450. In particular embodiments, one or more links 450 each includes an intranet, an extranet, a VPN, a LAN, a WLAN, a WAN, a MAN, a communications network, a satellite network, a portion of the Internet, or another link 450 or a combination of two or more such links 450. The present disclosure contemplates any suitable links 450 coupling servers 420 and clients 430 to network 410.

In particular embodiments, each server 420 may be a unitary server or may be a distributed server spanning multiple computers or multiple datacenters. Servers 420 may be of various types, such as, for example and without limitation, web server, news server, mail server, message server, advertising server, file server, application server, exchange server, database server, or proxy server. In particular embodiments, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A mail server is generally capable of providing electronic mail services to various clients 430. A database server is generally capable of providing an interface for managing data stored in one or more data stores.

In particular embodiments, each client 430 may be an electronic device including hardware, software, or embedded logic components or a combination of two or more such components and capable of carrying out the appropriate functionalities implemented or supported by client 430. For example and without limitation, a client 430 may be a desktop computer system, a notebook computer system, a netbook computer system, a handheld electronic device, or a mobile telephone. A client 430 may enable an network user at client 430 to access network 410. A client 430 may have a web browser, such as Microsoft Internet Explorer or Mozilla Firefox, and may have one or more add-ons, plug-ins, or other extensions, such as Google Toolbar or Yahoo Toolbar. A client 430 may enable its user to communicate with other users at other clients 430. The present disclosure contemplates any suitable clients 430.

In particular embodiments, one or more data storages 440 may be communicatively linked to one or more severs 420 via one or more links 450. In particular embodiments, data storages 440 may be used to store various types of information. In particular embodiments, the information stored in data storages 440 may be organized according to specific data structures. Particular embodiments may provide interfaces that enable servers 420 or clients 430 to manage (e.g., retrieve, modify, add, or delete) the information stored in data storage 440.

In particular embodiments, a server 420 may include a search engine 422. Search engine 422 may include hardware, software, or embedded logic components or a combination of two or more such components for carrying out the appropriate functionalities implemented or supported by search engine 422. For example and without limitation, search engine 422 may implement one or more search algorithms that may be used to identify network resources in response to the search queries received at search engine 422, one or more ranking algorithms that may be used to rank the identified network resources, one or more summarization algorithms that may be used to summarize the identified network resources, and so on. The negative semantic features may be applied to the ranking algorithms Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 5:
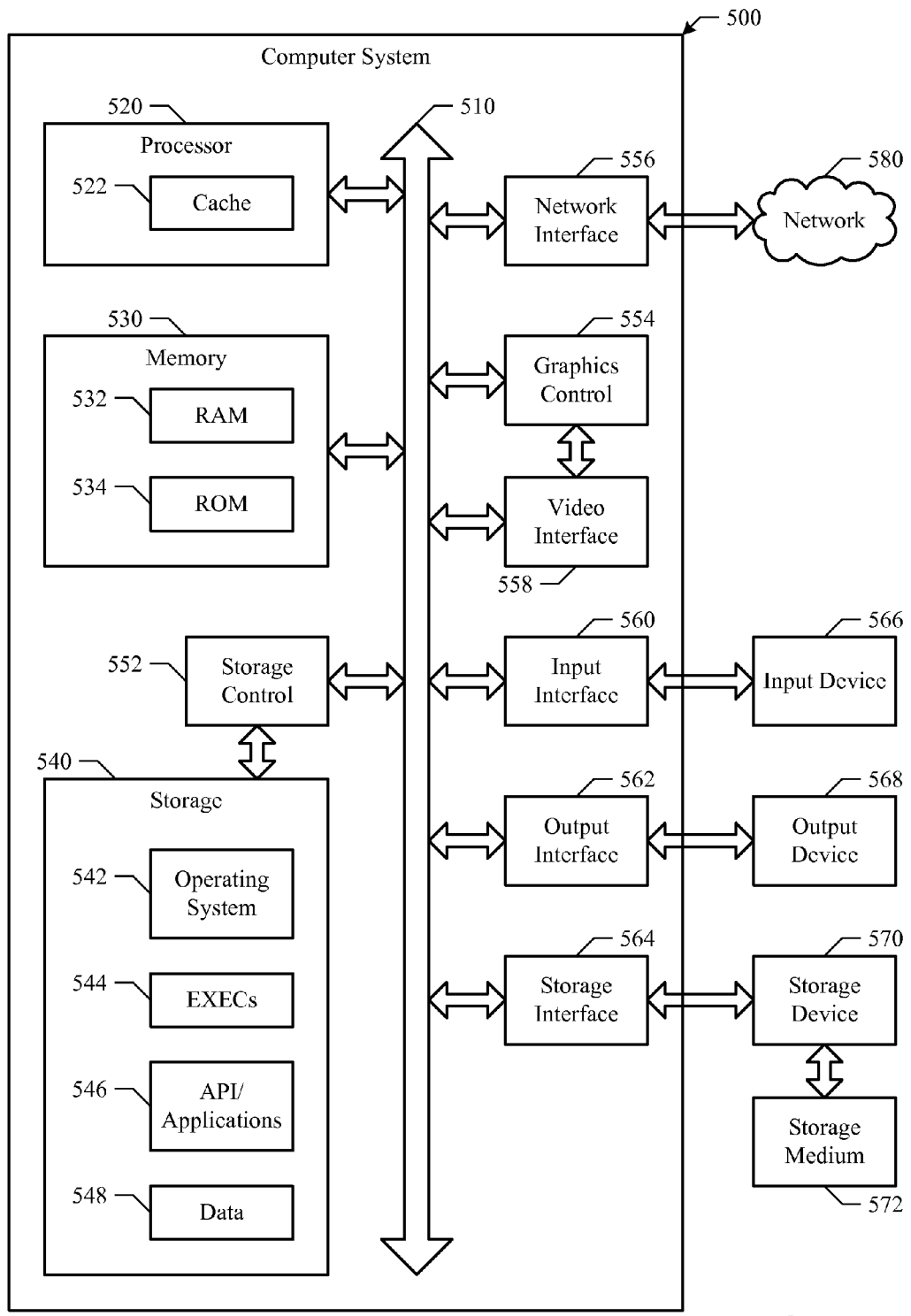
FIG. 5 illustrates an example computer system.

For example, FIG. 5 illustrates an example computer system 500 suitable for implementing one or more portions of particular embodiments. Although the present disclosure describes and illustrates a particular computer system 500 having particular components in a particular configuration, the present disclosure contemplates any suitable computer system having any suitable components in any suitable configuration. Moreover, computer system 500 may have take any suitable physical form, such as for example one or more integrated circuit (ICs), one or more printed circuit boards (PCBs), one or more handheld or other devices (such as mobile telephones or PDAs), one or more personal computers, or one or more super computers.

System bus 510 couples subsystems of computer system 500 to each other. Herein, reference to a bus encompasses one or more digital signal lines serving a common function. The present disclosure contemplates any suitable system bus 510 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 500 includes one or more processors 520 (or central processing units (CPUs)). A processor 520 may contain a cache 522 for temporary local storage of instructions, data, or computer addresses. Processors 520 are coupled to one or more storage devices, including memory 530. Memory 530 may include random access memory (RAM) 532 and read-only memory (ROM) 534. Data and instructions may transfer bidirectionally between processors 520 and RAM 532. Data and instructions may transfer unidirectionally to processors 520 from ROM 534. RAM 532 and ROM 534 may include any suitable computer-readable storage media.

Computer system 500 includes fixed storage 540 coupled bi-directionally to processors 520. Fixed storage 540 may be coupled to processors 520 via storage control unit 552. Fixed storage 540 may provide additional data storage capacity and may include any suitable computer-readable storage media. Fixed storage 540 may store an operating system (OS) 542, one or more executables 544, one or more applications or programs 546, data 548, and the like. Fixed storage 540 is typically a secondary storage medium (such as a hard disk) that is slower than primary storage. In appropriate cases, the information stored by fixed storage 540 may be incorporated as virtual memory into memory 530.

Processors 520 may be coupled to a variety of interfaces, such as, for example, graphics control 554, video interface 558, input interface 560, output interface 562, and storage interface 564, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 556 may couple processors 520 to another computer system or to network 580. With network interface 556, processors 520 may receive or send information from or to network 580 in the course of performing steps of particular embodiments. Particular embodiments may execute solely on processors 520. Particular embodiments may execute on processors 520 and on one or more remote processors operating together.

In a network environment, where computer system 500 is connected to network 580, computer system 500 may communicate with other devices connected to network 580. Computer system 500 may communicate with network 580 via network interface 556. For example, computer system 500 may receive information (such as a request or a response from another device) from network 580 in the form of one or more incoming packets at network interface 556 and memory 530 may store the incoming packets for subsequent processing. Computer system 500 may send information (such as a request or a response to another device) to network 580 in the form of one or more outgoing packets from network interface 556, which memory 530 may store prior to being sent. Processors 520 may access an incoming or outgoing packet in memory 530 to process it, according to particular needs.

Computer system 500 may have one or more input devices 566 (which may include a keypad, keyboard, mouse, stylus, etc.), one or more output devices 568 (which may include one or more displays, one or more speakers, one or more printers, etc.), one or more storage devices 570, and one or more storage medium 572. An input device 566 may be external or internal to computer system 500. An output device 568 may be external or internal to computer system 500. A storage device 570 may be external or internal to computer system 500. A storage medium 572 may be external or internal to computer system 500.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 530 may include one or more computer-readable storage media embodying software and computer system 500 may provide particular functionality described or illustrated herein as a result of processors 520 executing the software. Memory 530 may store and processors 520 may execute the software. Memory 530 may read the software from the computer-readable storage media in mass storage device 530 embodying the software or from one or more other sources via network interface 556. When executing the software, processors 520 may perform one or more steps of one or more processes described or illustrated herein, which may include defining one or more data structures for storage in memory 530 and modifying one or more of the data structures as directed by one or more portions the software, according to particular needs. In addition or as an alternative, computer system 500 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, comprising:
   accessing, by one or more computer systems, a search query comprising one or more query words, at least one of the query words representing one or more query concepts;
   accessing, by the one or more computer systems, a network document identified for a search query by a search engine, the network document comprising one or more document words, at least one of the document words representing one or more document concepts;
   semantic-text matching, by the one or more computer systems, the search query and the network document to determine one or more negative semantic-text matches; and
   constructing, by the one or more computer systems, one or more negative features based on the negative semantic-text matches, wherein the negative semantic-text matches comprises one or more mismatches or one or more extra-matches, wherein:
   a mismatch occurs when one of the document concepts corresponds to one of the query concepts and the document words representing the one document concept are contained in a section of the network document and the query words representing the one query concept or a synonym of the query words representing the one query concept are not contained in the same section of the network document; and
   an extra-match occurs when one of the document concepts does not correspond to any one of the query concepts.

2. The method recited in 1, further comprising:
   semantic parsing, by the one or more computer systems, the network document to determine the document concepts represented by the document words; and
   semantic parsing, by the one or more computer systems, the search query to determine the query concepts represented by the query words.

3. The method recited in 2, wherein:
   semantic parsing the search query comprises:
      semantic parsing the search query using a first semantic parser to determine a first set of query concepts represented by the query words; and
      semantic parsing the search query using a second semantic parser to determine a second set of query concepts represented by the query words;
   semantic-text matching the search query and the network document comprises:
      text matching the query words with the document words and semantic matching the first set of query concepts with the document concepts to determine a first set of negative semantic-text matches; and
      text matching the query words with the document words and semantic matching the second set of query concepts with the document concepts to determine a second set of negative semantic-text matches; and
   constructing one or more negative features comprises:
      constructing a first set of negative features based on the first set of negative semantic-text matches; and
      constructing a second set of negative features based on the second set of negative semantic-text matches.

4. The method recited in 2, wherein:
   the network document is semantically parsed using a low-resolution semantic parser; and
   the search query is semantically parsed using a high-resolution semantic parser.

5. The method recited in 4, wherein the high-resolution semantic parser and the low-resolution semantic parser are each based on one or more statistical models comprising conditional random field, hidden Markov model, finite state machine, and maximum entropy model.

6. The method recited in 1, further comprising for each of the document concepts, determining, by the one or more computer systems, one or more main document words representing the document concept, comprising:
   for each of the document concepts,
      ranking all the document words in the network document that represent the document concept; and
      identifying one or more top-ranked document words that represent the document concept as the main document words representing the document concept.

7. The method recited in 6,
   wherein:
      the network document comprises one or more sections; and
      each of the sections comprises one or more of the document words; and
   further comprising:
      for each of the document concepts, determining, by the one or more computer systems, whether each of the sections contains the main document words representing the document concept.

8. The method recited in 7, wherein semantic-text matching the search query and the network document comprises:
   for each of the sections of the network document, semantic-text matching the search query and the section to determine one or more of the negative matches from the section.

9. The method recited in 7, wherein:
   each of the sections in the network document is associated with a weight;
   for each of the document concepts, all the document words representing the document concept are ranked based on a number of times each of the document words representing the document concept appears in each of the sections and the weight associated with each of the sections.

10. The method recited in 1, wherein when determining each of the mismatches, the document words representing each of the document concepts are the main document words representing the document concept.

11. The method recited in 1, further comprising applying, by the one or more computer systems, the negative features to a ranking algorithm implemented by a search engine.

12. A system, comprising: a memory comprising instructions executable by one or more processors; and one or more processors coupled to the memory and operable to execute the instructions, the one or more processors being operable when executing the instructions to:

access a search query comprising one or more query words, at least one of the query words representing one or more query concepts;

access a network document identified for a search query by a search engine, the network document comprising one or more document words, at least one of the document words representing one or more document concepts;

semantic-text match the search query and the network document to determine one or more negative semantic-text matches; and construct one or more negative features based on the negative semantic-text matches, wherein the negative semantic-text matches comprises one or more mismatches or one or more extra-matches, wherein:

a mismatch occurs when one of the document concepts corresponds to one of the query concepts and the document words representing the one document concept are contained in a section of the network document and the query words representing the one query concept or a synonym of the query words representing the one query concept are not contained in the same section of the network document; and an extra-match occurs when one of the document concepts does not correspond to any one of the query concepts.

13. The system recited in 12, wherein the one or more processors being further operable when executing the instructions to:

semantic parse the network document to determine the document concepts represented by the document words; and semantic parse the search query to determine the query concepts represented by the query words.

14. The system recited in 13, wherein:

semantic parse the search query comprises:

semantic parse the search query using a first semantic parser to determine a first set of query concepts represented by the query words; and semantic parse the search query using a second semantic parser to determine a second set of query concepts represented by the query words;

semantic-text match the search query and the network document comprises:

text match the query words with the document words and semantic match the first set of query concepts with the document concepts to determine a first set of negative semantic-text matches; and text match the query words with the document words and semantic match the second set of query concepts with the document concepts to determine a second set of negative semantic-text matches; and constructing one or more negative features comprises:

construct a first set of negative features based on the first set of negative semantic-text matches; and construct a second set of negative features based on the second set of negative semantic-text matches.

15. The system recited in 13, wherein:

the network document is semantically parsed using a low-resolution semantic parser; and the search query is semantically parsed using a high-resolution semantic parser.

16. The system recited in 15, wherein the high-resolution semantic parser and the low-resolution semantic parser are each based on one or more statistical models comprising conditional random field, hidden Markov model, finite state machine, and maximum entropy model.

17. The system recited in 12, wherein the one or more processors being further operable when executing the instructions to for each of the document concepts, determine one or more main document words representing the document concept, comprising:

for each of the document concepts, rank all the document words in the network document that represent the document concept; and identify one or more top-ranked document words that represent the document concept as the main document words representing the document concept.

18. The system recited in 17, wherein:

the network document comprises one or more sections; and each of the sections comprises one or more of the document words; and the one or more processors being further operable when executing the instructions to:

for each of the document concepts, determine whether each of the sections contains the main document words representing the document concept.

19. The system recited in 18, wherein semantic-text match the search query and the network document comprises:

for each of the sections of the network document, semantic-text match the search query and the section to determine one or more of the negative matches from the section.

20. The system recited in 18, wherein:

each of the sections in the network document is associated with a weight;

for each of the document concepts, all the document words representing the document concept are ranked based on a number of times each of the document words representing the document concept appears in each of the sections and the weight associated with each of the sections.

21. The system recited in 12, wherein when determining each of the mismatches, the document words representing each of the document concepts are the main document words representing the document concept.

22. The system recited in 12, wherein the one or more processors being further operable when executing the instructions to apply the negative features to a ranking algorithm implemented by a search engine.

23. One or more computer-readable storage media embodying software operable when executed by one or more computer systems to:

access a search query comprising one or more query words, at least one of the query words representing one or more query concepts;

access a network document identified for a search query by a search engine, the network document comprising one or more document words, at least one of the document words representing one or more document concepts;

semantic-text match the search query and the network document to determine one or more negative semantic-text matches; and construct one or more negative features based on the negative semantic-text matches, wherein the negative semantic-text matches comprises one or more mismatches or one or more extra-matches, wherein:

a mismatch occurs when one of the document concepts corresponds to one of the query concepts and the document words representing the one document concept are contained in a section of the network document and the query words representing the one query concept or a synonym of the query words representing the one query concept are not contained in the same section of the network document; and an extra-match occurs when one of the document concepts does not correspond to any one of the query concepts.

24. The media recited in 23, wherein the software is further operable when executed by the one or more computer systems to:
- semantic parse the network document to determine the document concepts represented by the document words; and
- semantic parse the search query to determine the query concepts represented by the query words.

25. The media recited in 24, wherein:
semantic parse the search query comprises:
- semantic parse the search query using a first semantic parser to determine a first set of query concepts represented by the query words; and
- semantic parse the search query using a second semantic parser to determine a second set of query concepts represented by the query words;

semantic-text match the search query and the network document comprises:
- text match the query words with the document words and semantic match the first set of query concepts with the document concepts to determine a first set of negative semantic-text matches; and
- text match the query words with the document words and semantic match the second set of query concepts with the document concepts to determine a second set of negative semantic-text matches; and constructing one or more negative features comprises:
- construct a first set of negative features based on the first set of negative semantic-text matches; and
- construct a second set of negative features based on the second set of negative semantic-text matches.

26. The media recited in 24, wherein:
- the network document is semantically parsed using a low-resolution semantic parser; and
- the search query is semantically parsed using a high-resolution semantic parser.

27. The media recited in 26, wherein the high-resolution semantic parser and the low-resolution semantic parser are each based on one or more statistical models comprising conditional random field, hidden Markov model, finite state machine, and maximum entropy model.

28. The media recited in 23, wherein the software is further operable when executed by the one or more computer systems to for each of the document concepts, determine one or more main document words representing the document concept, comprising:
for each of the document concepts,
- rank all the document words in the network document that represent the document concept; and
- identify one or more top-ranked document words that represent the document concept as the main document words representing the document concept.

29. The media recited in 28, wherein:
the network document comprises one or more sections; and
each of the sections comprises one or more of the document words; and
wherein the software is further operable when executed by the one or more computer systems to:
- for each of the document concepts, determine whether each of the sections contains the main document words representing the document concept.

30. The media recited in 29, wherein semantic-text match the search query and the network document comprises:
- for each of the sections of the network document, semantic-text match the search query and the section to determine one or more of the negative matches from the section.

31. The media recited in 29, wherein:
each of the sections in the network document is associated with a weight;
for each of the document concepts, all the document words representing the document concept are ranked based on a number of times each of the document words representing the document concept appears in each of the sections and the weight associated with each of the sections.

32. The media recited in 23, wherein when determining each of the mismatches, the document words representing each of the document concepts are the main document words representing the document concept.

33. The media recited in 23, wherein the software is further operable when executed by the one or more computer systems to apply the negative features to a ranking algorithm implemented by a search engine.

\* \* \* \* \*